United States Patent
Anand et al.

(10) Patent No.: US 11,960,520 B2
(45) Date of Patent: Apr. 16, 2024

(54) HIERARCHICAL TOPIC MODEL WITH AN INTERPRETABLE TOPIC HIERARCHY

(71) Applicant: Adobe Inc., San Jose, CA (US)

(72) Inventors: Tanay Anand, Uttar Pradesh (IN);
Sumit Bhatia, Uttar Pradesh (IN);
Simra Shahid, Uttar Pradesh (IN);
Nikitha Srikanth, Mysore (IN);
Nikaash Puri, Uttar Pradesh (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/853,141

(22) Filed: Jun. 29, 2022

(65) Prior Publication Data

US 2024/0004912 A1     Jan. 4, 2024

(51) Int. Cl.
| | |
|---|---|
| *G06F 16/30* | (2019.01) |
| *G06F 16/33* | (2019.01) |
| *G06F 16/35* | (2019.01) |
| *G06F 16/93* | (2019.01) |
| *G06F 18/2133* | (2023.01) |

(Continued)

(52) U.S. Cl.
CPC .......... *G06F 16/35* (2019.01); *G06F 16/3347* (2019.01); *G06F 16/93* (2019.01); *G06F 18/2133* (2023.01); *G06F 18/24147* (2023.01); *G06F 40/30* (2020.01)

(58) Field of Classification Search
CPC ...... G06F 16/35; G06F 16/93; G06F 16/3347; G06F 40/30; G06F 18/2133; G06F 18/24147
See application file for complete search history.

(56) References Cited

U.S. PATENT DOCUMENTS

| | | | |
|---|---|---|---|
| 2012/0203752 A1* | 8/2012 | Ha-Thuc .................. | G06F 16/35 707/706 |
| 2015/0106078 A1* | 4/2015 | Chang ..................... | G06F 16/35 704/9 |

(Continued)

OTHER PUBLICATIONS

Article entitled "HyHTM: Hyperbolic Geometry based Hierarchical Topic Models" by Shahid et al., dated 2023 (Year: 2023).*

(Continued)

*Primary Examiner* — Mahesh H Dwivedi
(74) *Attorney, Agent, or Firm* — Kilpatrick Townsend & Stockton LLP

(57) ABSTRACT

Some techniques described herein relate to generating a hierarchical topic model (HTM), which can be used to generate custom content. In one example, a method includes determining first-level topics in a topic hierarchy related to a corpus of documents. A first-level topic of the first-level topics includes multiple words. The multiple words are grouped into clusters based on word embeddings of the multiple words. The multiple words are then subdivided into second-level topics as subtopics of the first-level topic, such that the number of second-level topics equals the number of clusters. A document of the corpus of documents is assigned to the first-level topic and to a second-level topic of the second-level topics, and an indication is received of access by a user to the document. Custom content is generated for the user based on one or more other documents assigned to the first-level topic and the second-level topic.

20 Claims, 8 Drawing Sheets

(51) Int. Cl.
G06F 18/2413 (2023.01)
G06F 40/30 (2020.01)

(56) References Cited

U.S. PATENT DOCUMENTS

2015/0106156 A1* 4/2015 Chang ............... G06Q 30/0201
                                                        705/7.29
2016/0070731 A1* 3/2016 Chang ............... G06F 16/285
                                                        707/741

OTHER PUBLICATIONS

Aletras et al., Evaluating Topic Coherence Using Distributional Semantics, Proceedings of the 10th International Conference on Computational Semantics (IWCS 2013), Mar. 2013, pp. 13-22.
Blei et al., Hierarchical Topic Models and the Nested Chinese Restaurant Process, Advances in Neural Information Processing Systems, vol. 16, Dec. 8-13, 2003, pp. 17-24.
Blei et al., Latent Dirichlet Allocation, Advances in Neural Information Processing Systems, vol. 14, Dec. 3-8, 2001, pp. 601-608.
Bojanowski et al., Enriching Word Vectors with Subword Information, Transactions of the Association of Computational Linguistics, vol. 5, No. 1, Jun. 19, 2017, pp. 135-146.
Cannon et al., Hyperbolic Geometry, Flavors of Geometry, vol. 31, 1997, pp. 59-115.
Chami et al., Hyperbolic Graph Convolutional Neural Networks, Available Online at: https://arxiv.org/pdf/1910.12933.pdf, Oct. 30, 2019, pp. 1-20.
Chami et al., Low-Dimensional Hyperbolic Knowledge Graph Embeddings, Available Online at: https://arxiv.org/pdf/2005.00545.pdf, May 1, 2020, 14 pages.
Chirkova et al., Additive Regularization for Hierarchical Multimodal Topic Modeling, Journal of Machine Learning and Data Analysis, vol. 2, No. 2, Jan. 2016, pp. 187-200.
Dai et al., APo-VAE: Text Generation in Hyperbolic Space, Proceedings of the 2021 Conference of the North American Chapter of the Association for Computational Linguistics: Human Language Technologies, Jun. 6-11, 2021, pp. 416-431.
Duan et al., Sawtooth Factorial Topic Embeddings Guided Gamma Belief Network, Available Online at: https://arxiv.org/pdf/2107.02757.pdf, Jun. 30, 2021, 11 pages.
Duan et al., TopicNet: Semantic Graph-guided Topic Discovery, 35th Conference on Neural Information Processing Systems, Nov. 10, 2021, pp. 1-13.
Grootendorst, BERTopic: Neural Topic Modeling with a Class-based TF-IDF Procedure, Available Online at: https://arxiv.org/pdf/2203.05794.pdf, Mar. 11, 2022, 10 pages.
Guo et al., CO-SNE: Dimensionality Reduction and Visualization for Hyperbolic Data, Proceedings of the IEEE/CVF Conference on Computer Vision and Pattern Recognition, Jun. 2022, pp. 21-30.
Isonuma et al., Tree-Structured Neural Topic Model, Proceedings of the 58th Annual Meeting of the Association for Computational Linguistics, Jul. 2020, pp. 800-806.
Kim et al., Modeling Topic Hierarchies with the Recursive Chinese Restaurant Process, Proceedings of the 21st ACM International Conference on Information and Knowledge Management, Oct. 29, 2012, pp. 783-792.
Liu et al., Topic Splitting: A Hierarchical Topic Model Based on Non-negative Matrix Factorization, Journal of Systems Science and Systems Engineering, vol. 27, Jul. 2018, pp. 1-2.
Liu et al., Topic Splitting: A Hierarchical Topic Model Based on Non-Negative Matrix Factorization, Journal of Systems Science and Systems Engineering, vol. 27, No. 4, Jul. 19, 2018, pp. 479-496.
Meng et al., Hierarchical Topic Mining via Joint Spherical Tree and Text Embedding, Proceedings of the 26th ACM SIGKDD International Conference on Knowledge Discovery & Data Mining, Aug. 23-27, 2020, pp. 1908-1917.
Mikolov et al., Advances in Pre-Training Distributed Word Representations, Proceedings of the Eleventh International Conference on Language Resources and Evaluation (LREC 2018), May 2018, pp. 52-55.
Mikolov et al., Distributed Representations of Words and Phrases and their Compositionality, Advances in Neural Information Processing Systems, vol. 26, Oct. 16, 2013, pp. 1-9.
Nickel et al., Poincare Embeddings for Learning Hierarchical Representations, Available Online at: https://arxiv.org/pdf/1705.08039.pdf, May 26, 2017, pp. 1-10.
Paisley et al., A Nested HDP for Hierarchical Topic Models, Available Online at: https://arxiv.org/abs/1301.3570, Jan. 16, 2013, pp. 1-3.
Paul et al., Discovering Health Topics in Social Media Using Topic Models, PLoS One, vol. 9, No. 8, Aug. 1, 2014, pp. 1-11.
Pedregosa et al., Scikit-learn: Machine learning in Python, The Journal of Machine Learning Research, vol. 12, No. 85, Oct. 2011, pp. 2825-2830.
Pennington et al., GloVe: Global Vectors for Word Representation, Proceedings of the 2014 Conference on Empirical Methods in Natural Language Processing (EMNLP), Oct. 25-29, 2014, pp. 1532-1543.
Pham et al., Neural Topic Models for Hierarchical Topic Detection and Visualization, Joint European Conference on Machine Learning and Knowledge Discovery in Databases, Sep. 13, 2021, pp. 1-16.
Strazar et al., Orthogonal Matrix Factorization Enables Integrative Analysis of Multiple RNA Binding Proteins, Bioinformatics, vol. 32, No. 10, Jan. 18, 2016, pp. 1527-1535.
Teh et al., Sharing Clusters Among Related Groups: Hierarchical Dirichlet Processes, Advances in Neural Information Processing Systems, vol. 17, Dec. 1, 2004, 8 pages.
Tekumalla et al., Nested Hierarchical Dirichlet Processes for Multi-Level Non-Parametric Admixture Modeling, Available Online at: https://arxiv.org/pdf/1508.06446.pdf, Aug. 27, 2015, pp. 1-30.
Tifrea et al., Poincare GloVe: Hyperbolic Word Embeddings, International Conference on Learning Representations, Nov. 22, 2018, pp. 1-24.
Van Der Maaten et al., Visualizing Data Using t-SNE, Journal of Machine Learning Research, vol. 9, No. 11, Nov. 2008, pp. 2579-2605.
Viegas et al., CluHTM—Semantic Hierarchical Topic Modeling based on CluWords, Proceedings of the 58th Annual Meeting of the Association for Computational Linguistics, Jul. 5-10, 2020, pp. 8138-8150.
Viegas et al., CluWords: Exploiting Semantic Word Clusters for Enhanced Topic Modeling, 12th ACM International Web Search and Data Mining Conference (WSDM), Feb. 11-15, 2019, pp. 753-761.
Wang et al., Knowledge-aware Bayesian Deep Topic Model, Available Online at: https://arxiv.org/pdf/2209.14228.pdf, Sep. 20, 2022, pp. 1-17.
Wang et al., Layer-assisted Neural Topic Modeling Over Document Networks, Proceedings of the Thirtieth International Joint Conference on Artificial Intelligence (IJCAI-21), 2021, pp. 3148-3154.
Xu et al., HyperMiner: Topic Taxonomy Mining with Hyperbolic Embedding, 36th Conference on Neural Information Processing Systems, Oct. 16, 2022, pp. 1-14.

* cited by examiner

HIERARCHICAL TOPIC MODEL WITH AN INTERPRETABLE TOPIC HIERARCHY

TECHNICAL FIELD

This disclosure generally relates to topic models, more specifically, to a topic model with an interpretable topic hierarchy based on selective, non-arbitrary numbers of subtopics per topic.

BACKGROUND

In the digital age, information can be stored in various types of documents, including text files, word-processing files, blog posts, news articles, scientific articles, technical papers, or various other document types. An organization that stores documents may seek a way to organize and group the documents to make the information therein easier to analyze or otherwise consume. Some techniques for organizing documents involve topic models. A topic model is a statistical model generated through topic modeling, which often involves unsupervised machine learning to organize a collection of documents into groups, referred to as topics. A topic model typically includes a collection of topics, such that each of the document is assigned to one or more of such topics. Typically, a topic model is based on statistics of the words within the documents, and each topic of a topic model is a cluster of words deemed to be similar and deemed to relate to a common concept. Once documents are grouped into topics, the groups can be analyzed individually or assumptions can be made about commonality between documents, where such assumptions can be useful in analyzing, recommending, or otherwise using the documents.

In natural language, topics of documents tend to have a naturally hierarchy. For instance, within the topic "computers," there may be subtopics "operating systems," "processors," and "graphics cards." Flat topic models, in which topics have no hierarchy with respect to one another, fail to capture this inherent hierarchy. To overcome these limitations, hierarchical topic models have been introduced to place topics within a topic hierarchy. Hierarchical topic models are becoming increasingly popular due to their ability to identify patterns among different topics, and thus among documents related to the different topics, which can reduce additional analysis needed to consume and use information within documents.

SUMMARY

Some techniques described herein relate to generating a hierarchical topic model (HTM), which can be used to provide custom content. In some embodiments, a content customization system includes a topic modeling system and a content generation system. The topic modeling system may determine first-level topics of documents in a corpus. Each first-level topic may include a set of words. Given each first-level topic that includes words, the topic modeling system clusters those words according to their respective hyperbolic word embeddings and identifies the resulting quantity of clusters. The topic modeling system may then set the number of second-level topics corresponding to the first-level topic equal to the number of clusters and may determine the second-level topics based on those clusters. In this manner, the hyperbolic word embeddings of the words in a given topic can be used to determine the number and nature of the corresponding subtopics. If third-level topics are desired for the HTM, the topic-modeling system may repeat this process for each second-level topic to determine corresponding third-level topics, and so on for each level of the HTM desired.

The topic modeling system may assign each document of the corpus to a first-level topic and to a second-level topic corresponding to the first-level topics and, if applicable, to topics at further levels of the HTM. In some embodiments, the content generation system receives an indication of access by a user to a document. The content generation system may identify the topics at various levels of the HTM to which the document belongs and, further, may identify other documents assigned to the same topics. Based on those other documents, the content generation system may generate custom content for the user. For instance, the custom content can be a recommendation or a list of one or more of the other documents.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
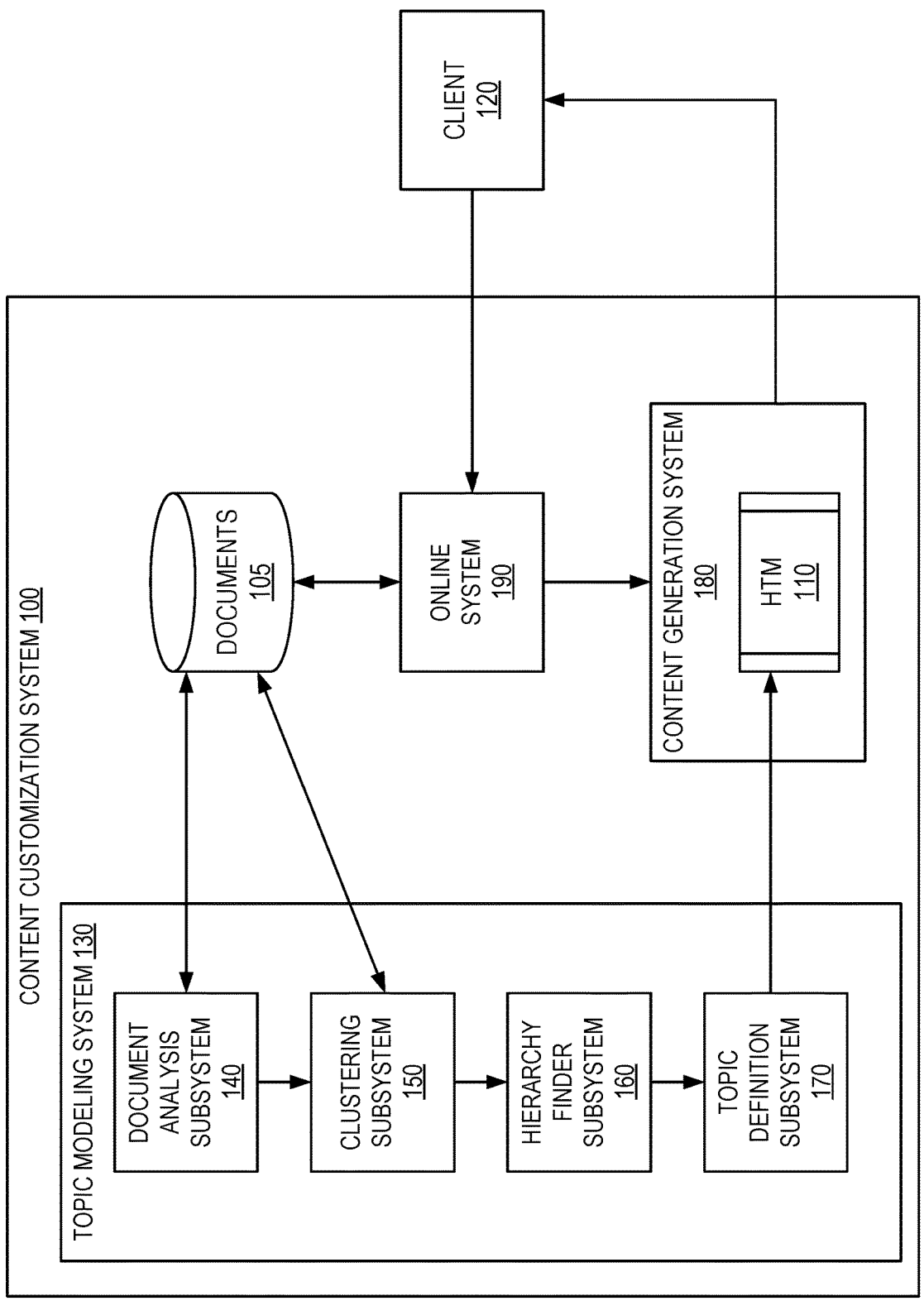
FIG. 1 is a diagram of an example of a content customization system configured to construct a hierarchical topic model (HTM) and then use the HTM to generate custom content, according to some embodiments described herein.

As described above, topics within documents tend to have an inherent hierarchy, and hierarchical topic models (HTMs) can be used to model that hierarchy. An HTM has multiple levels of topics with varying granularity, and these multiple levels capture a deeper understanding of documents. Existing HTMs do a good job of defining topics within a given level of a hierarchy. However, existing HTMs fail to capture coherent and distinct topic-subtopic relations, such that a subtopic might have no clear relationship to its parent topic. A reason for this is the arbitrary selection of a number of subtopics per topic; for instance, some existing systems for topic modeling utilize a fixed number of sub-topics per topic, rather than basing the number of subtopics on observations about the documents themselves. Additionally, many existing systems have an unreasonably long training time, which can lead to a high resource cost each time the HTM is generated, such as each time a new batch of documents become available.

In contrast, some embodiments described herein involve topic modeling to generate HTMs that are interpretable, in the sense that there is a definable and articulable relationship between topics and subtopics. Given an interpretable HTM, a user or administrator of the HTM can easily see the connections between topics and subtopics and, as a result, can more easily find and use documents associated with desired topics. To this end, an example of a topic modeling system described herein clusters words of a topic according to the hyperbolic word embeddings of those words. Unlike Euclidean word embeddings, hyperbolic word embeddings have been shown to capture semantic hierarchies. The number of clusters is an indication of the number of subtopics of the topic, and the topic modeling system can then utilize the clusters as basis for determining subtopics.

The following non-limiting example is provided to introduce certain embodiments. In this example, a content customization system includes a topic modeling system and a content generation system. The content customization system is implemented by a computer system and has access to a corpus of documents, which may be stored on the computer system or in a remote storage device. In this example, the topic modeling system determines first-level topics of the documents in the corpus. For instance, to this end, the topic modeling system determines a first matrix representing semantic relations between words in the documents, based on hyperbolic word embeddings, and second matrix representing statistical relations (e.g., co-occurrences) between words in the documents, based on co-occurrences of words in the documents. The topic modeling system multiplies the second matrix by the first matrix and performs matrix factorization on the result, to produce a pair of matrices. From the pair of matrices, the topic modeling system extracts words defining each first-level topic as well as indications of assignments of the documents to respective first-level topics.

In this example, the topic modeling system then identifies second-level topics (i.e., subtopics) for each first-level topic. Given a first-level topic that includes words, the topic modeling system clusters those words according to their hyperbolic word embeddings and identifies the resulting quantity of clusters. The topic modeling system can then determine second-level topics of the first-level topic in the same quantity as the quantity of clusters. The topic modeling system assigns each document of the first-level topic to a second-level topic. This is done for each first-level topic, and further, the example of the topic modeling system recursively defines additional levels of the topic hierarchy by clustering the words of each topic of a given level and then identifying a number of subtopics equal in number to the quantity of topics. The topic modeling system eventually assigns each document to a set of topics, potentially including a first-level topic, a second-level topic that is a subtopic of the first level topic, and potentially lower-level topics of the topic hierarchy.

Further, in this example, the content generation system receives an indication of access by a user to a document, for instance, when a user accesses the document through a client configured to access documents of the corpus. The content generation system identifies the topics at various levels associated with the document and, further, identifies other documents assigned to the same topics. Based on those other documents, the content generation system generates custom content for the user. For instance, the custom content can be a recommendation or a list of one or more of the other documents.

Certain embodiments described herein represent improvements in the technical field of machine learning and topic modeling and, in particular, unsupervised learning to generate hierarchical topic models. Unlike existing systems for topic modeling, embodiments of the topic modeling system described herein utilize hyperbolic word embeddings, which capture hierarchical relations between words. By clustering words of a topic based on their respective hyperbolic word embeddings, embodiments of the topic modeling system determine a number of subtopics based on observation, rather than arbitrarily, thus leading to topic-subtopic relationships that are easily interpretable. Further, some embodiments of the topic modeling system generate an HTM more quickly than HTMs are typically generated by existing systems. For instance, while existing techniques test the performance of an HTM with varying hyper-parameters, such as the number of subtopics per topic, embodiments described herein use an intelligent algorithm to determine the subtopics and the number of subtopics. As a result, embodiments of a topic modeling system described herein can reduce resource costs in generating an HTM.

Example of a Topic Modeling System

FIG. 1 is a diagram of an example of a content customization system 100 configured to construct a hierarchical topic model 110 and to use the HTM 110 to generate custom content, according to some embodiments described herein. The content customization system 100 may include a topic modeling system 130, configured to construct an HTM 110, and a content generation system 180, configured to generate custom content for users based on the HTM 110.

In some embodiments, each of the topic modeling system 130 and the content generation system 180 is implemented by one or more computing devices running program code to perform operations described herein. For instance, the topic modeling system 130 is implemented as program code running on a server, and the content generation system 180 is implemented as program code running on one or more computing nodes of a cloud-computing environment, such that the content generation system 180 is accessible by one or more clients 120. In some embodiments, the topic modeling system 130 and the content generation system 180 are implemented on distinct computing devices, but in other embodiments, the topic modeling system 130 and the content generation system 180 are implemented on a shared one or more computing devices and may include shared hardware, software, or both. Various implementations are possible and are within the scope of this disclosure.

As shown in FIG. 1, in some embodiments, the topic modeling system 130 includes a document analysis subsystem 140, a clustering subsystem 150, a hierarchy finder subsystem 160, and a topic definition subsystem 170. Each of the document analysis subsystem 140, the clustering subsystem 150, the hierarchy finder subsystem 160, and the topic definition subsystem 170 is implemented as hardware, software, or a combination of both. Although the document analysis subsystem 140, the clustering subsystem 150, the hierarchy finder subsystem 160, and the topic definition subsystem 170 are shown in FIG. 1 as being distinct, this distinction is for illustrative purposes only and does not limited the various embodiments described herein. Rather, the document analysis subsystem 140, the clustering subsystem 150, the hierarchy finder subsystem 160, and the topic definition subsystem 170 may share hardware, software, or a combination of both.

As described in detail below, a topic includes a set of words. An example of the clustering subsystem 150 determines word embeddings, such as hyperbolic word embeddings, of words in a topic and groups those word embeddings into clusters based on distances between the word embeddings. The clusters may be used as a basis for determining subtopics. A word embedding, also referred to herein as an embedding, is a vector representation of a word, such that semantically similar words have similar vector representations. A hyperbolic word embedding is a word embedding in which the vector space used for representing words is a hyperbolic space. An example of the document analysis subsystem 140 analyzes documents 105 assigned to the topic. As a result of the analysis, the document analysis subsystem 140 may determine semantic relations describing relationships between pairs of words in the documents 105 and statistical relations describing relationships between words and documents 105. An example of the hierarchy finder subsystem 160 utilizes the word embeddings to determine hierarchical relations between words of the documents 105 and, based on the hierarchical relations in combination with the statistical and semantic relations, generates matrices describing subtopics. An example of the topic definition subsystem 170 extracts from the matrices definitions of subtopics and also assigns each document to a corresponding subtopic. Additional details of the operations of each of these subsystems are described below.

In some embodiments, a client 120 is a computing device or a portion of a computing device configured to access documents 105 in an online system 190. In some examples, the client 120 is or includes an application, such as a web application, configured to provide an interface for interactions with the online system 190. A user of the client 120 can operate the client 120 to access one or more documents 105, such as for the purpose of reading or otherwise using the documents. One or multiple clients 120 may be communication with the online system 190 to access documents. The online system 190 could be various computing systems configured to host or otherwise provide documents 105 in a manner that is accessible to clients 120. For instance, the online system 190 could be a search facility or a document server. The online system 190 may be implemented as program code running on one or more computing devices. The online system 190 may further include or have access to a storage device for maintaining documents 105, or additionally or alternatively, the online system 190 may include a network adapter enabling the online system 190 to access the documents 105 remotely so as to provide one or more documents 105 to clients 120.

In some embodiments, upon receiving an indication that the client 120 has accessed a document, such as via the online system 190, the content generation system 180 generates custom content for the client 120 and for a user of the client 120. For instance, the content generation system 180 identifies a set of topics, including topics at various levels of a topic hierarchy, to which the document 105 is assigned. Other documents may also be assigned to the same set of topics, and the content generation system 180 may identify those other documents. Based on the other documents, the content generation system may generate custom content for delivery to the user at the client 120. For instance, the custom content is a recommendation of one or more of the other documents.

Figure 2:
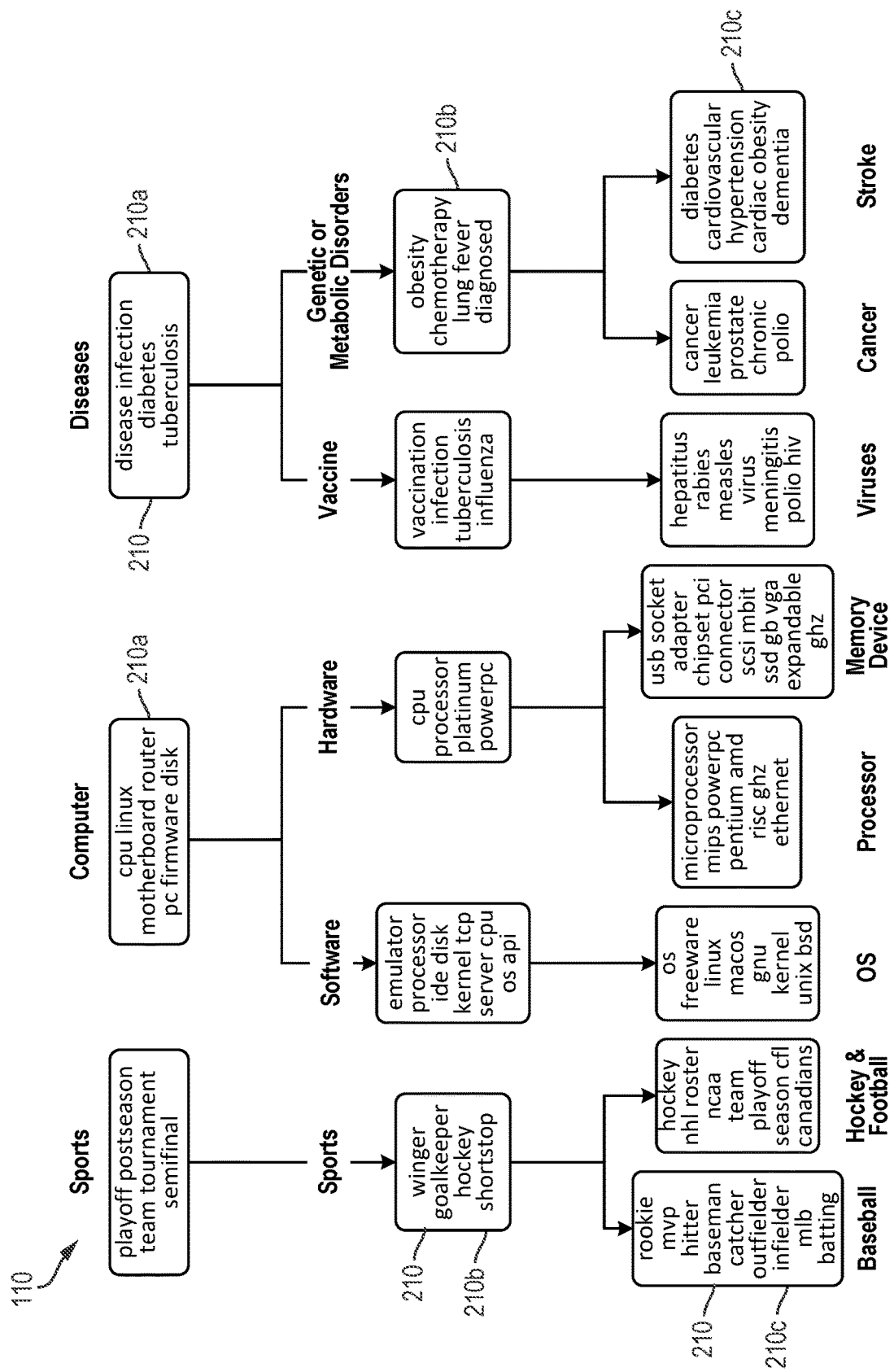
FIG. 2 is example of an HTM that could be generated by a topic modeling system of the content customization system, according to some embodiments described herein.

FIG. 2 is example of an HTM 110 that could be generated by a topic modeling system 130, according to some embodiments described herein. The HTM 110 shown includes a set of nodes 210, each representing a topic in a topic hierarchy. The words shown within each node 210 are the words in the corresponding topic. The nodes 210 of the HTM 110 include first-level nodes 210a representing first-level topics, second-level nodes 210b representing second-level topics, and third-level nodes 210c representing third-level topics. Each third-level topic is a subtopic of a second-level topic, and each second-level topic is a subtopic of a first-level topic. The highest level of topics are first-level topics, and in the example shown, the lowest level of topics are third-level topics. However, some embodiments of an HTM 110 may have only two levels or may include still lower levels of topics.

As shown in FIG. 2, a given topic can have one or multiple subtopics. The words of a subtopic may be, but need not be, a subset (e.g., a proper subset) of the words of the parent topic, possibly in conjunction with additional words. Generally, the words in a subtopic can suggest a narrower version of the words in the topic. The number of subtopics of a given topic can vary. Specifically, in some embodiments, the number of subtopics of a topic is equal to, or otherwise based on, the number of clusters generated for word embeddings (e.g., hyperbolic word embeddings) of the topic. In some embodiments, however, a given subtopic belongs to only a single topic, as demonstrated in FIG. 2 by the fact that each node 210 has only a single parent node 210. As described in more detail below, in some embodiments, a document 105 can be assigned to a first-level topic, to second-level topic that is a subtopic of the first-level topic, to a third-level topic that is a subtopic of the second-level topic, and so on. Thus, a document 105 may be assigned to a set of topics, which may include a topic at each level of the hierarchy.

Figure 3:
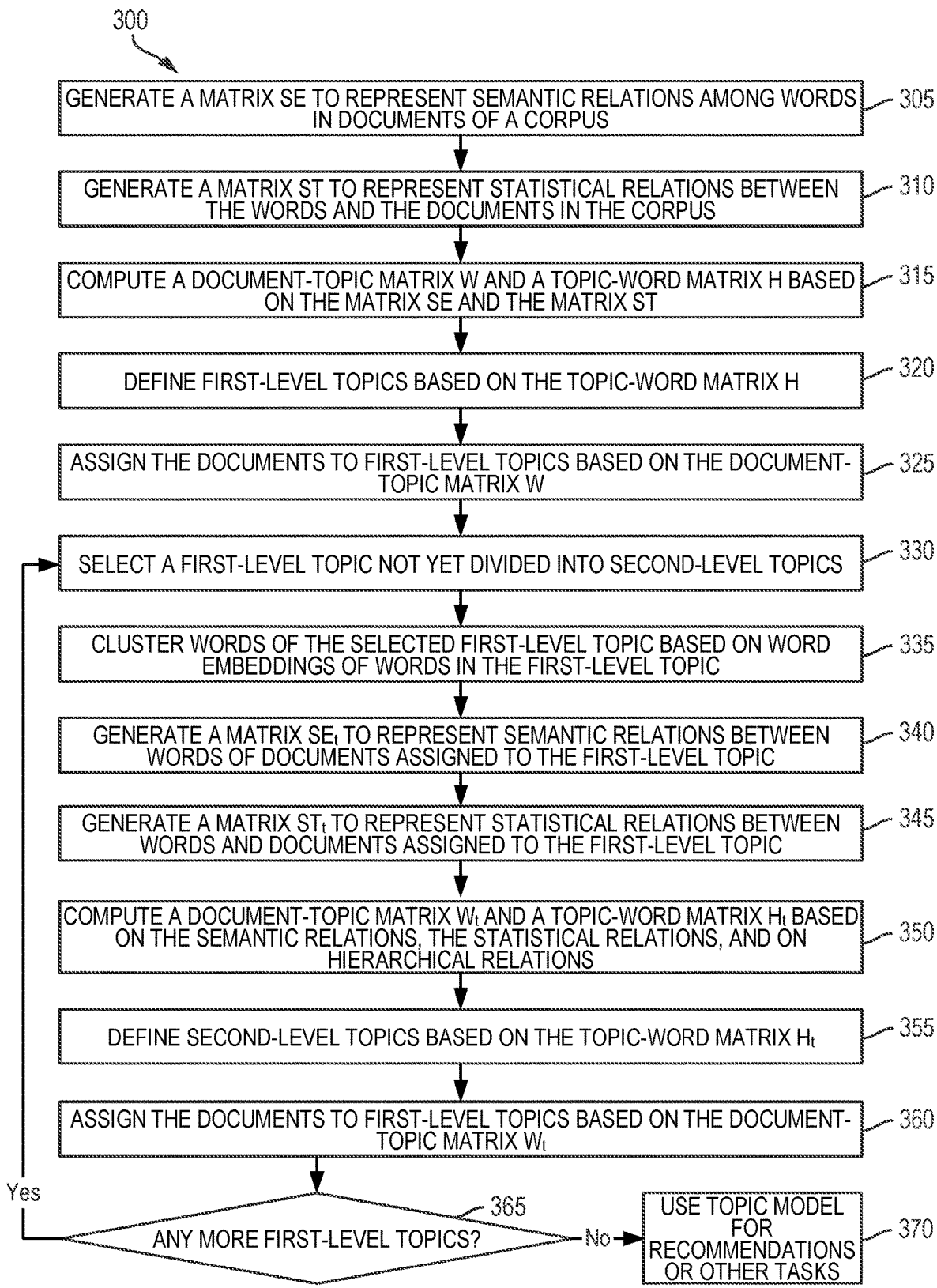
FIG. 3 is a flow diagram of an example of a process for generating an HTM, according to some embodiments described herein.

FIG. 3 is a flow diagram of an example of a process 300 for generating an HTM 110, according to some embodiments described herein. The process 300 depicted in FIG. 3 may be implemented in software executed by one or more processing units of a computing system, implemented in hardware, or implemented as a combination of software and hardware. This process 300 is intended to be illustrative and non-limiting. Although FIG. 3 depicts various processing operations occurring in a particular order, the particular order depicted is not required. In certain alternative embodiments, the processing may be performed in a different order, some operations may be performed in parallel, or operations may be added, removed, or combined together. In some embodiments, this process 300 or similar is performed by the topic modeling system 130, including the clustering subsystem 150, the hierarchy finder subsystem 160, and the topic definition subsystem 170.

In FIG. 3, blocks 305-325 of the process 300 are operations in determining first-level topics in a topic hierarchy. Specifically, at block 305, the process 300 involves generating a semantic relations matrix, Matrix SE, to represent semantic relations between pairs of words in documents 105 of a corpus. In some embodiments, the document analysis subsystem 140 examines the documents 105 and, from that examination, generates the semantic relations matrix. The semantic relations matrix may indicate co-occurrences between words in the documents 105. In some embodiments, the hierarchy finder subsystem 160 constructs the semantic relations matrix based on words in the documents 105. For instance, semantic relations matrix includes rows representing words found in the documents 105 and columns also representing words found in the documents 105. For instance, both the rows and columns may represent all words deemed significant (e.g., excluding certain words such as articles and prepositions) in the documents 105. Herein, this disclosure frequently makes reference to "words" or "all words" of certain documents 105; it will be understood that some words deemed insignificant may be excluded. Each cell of semantic relations matrix can indicate how many documents 105 of the corpus include both the word represented by the corresponding row and the word represented by the corresponding column.

At block 310, the process 300 involves generating a statistical relations matrix, Matrix ST, to represent statistical relations between words in the documents 105 of the corpus. In some embodiments, the document analysis subsystem 140 examines the documents 105 and, from that examination, generates the statistical relations matrix. The statistical relations matrix may indicate co-occurrences of words within the documents 105 of the corpus. In some embodiments, the document analysis subsystem 140 constructs the statistical relations matrix based on words in the documents 105. For instance, the statistical relations matrix includes rows representing the documents 105 and columns representing words found in the documents 105. For instance, the rows may represent all documents 105 of the corpus, and the columns may represent all words deemed significant (e.g., excluding certain words such as articles and prepositions) in the documents 105. Each cell of the statistical relations matrix can indicate a count of how many times the word represented by the corresponding column appears in the document 105 represented by the corresponding row.

At block 315, the process 300 involves computing a document-topic matrix, Matrix W, and a topic-word matrix, Matrix H, based on the semantic relations matrix generated at block 305 and the statistical relations matrix generated at block 310. To this end, in some embodiments, the hierarchy finder subsystem 160 multiplies the statistical relations matrix by the semantic relations matrix and computes a matrix factorization of the resulting product, based on a predefined hyper-parameter. The predefined hyper-parameter and may be initially determined based on testing and may equal the number of first-level topics to be defined; for example, the predefined hyper-parameter has a value of twenty. The result of the matrix factorization may include the document-topic matrix and the topic-word matrix, which include information for defining topics and assigning documents 105 of the corpus to respective topics. In some embodiments, the number of columns in the document-topic matrix and the number of rows in the topic-word matrix each equal the predefined hyper-parameter.

At block 320, the process 300 involves defining the first-level topics. In some embodiments, the topic definition subsystem 170 defines each first-level topic based on the topic-word matrix determined at block 315. In the topic-word matrix, each row can represent a first-level topic, and each column can represent a word. Thus, the number of first-level topics may equal the number of rows of the topic-word matrix. The topic definition subsystem 170 may define each first-level topic as the top l words, i.e., the words having the highest values, in the row corresponding to that first-level topic. The value of l may be defined by an administrator in some embodiments.

At block 325, the process 300 involves assigning each document to a first-level topic. In some embodiments, the topic definition subsystem 170 categorizes the documents 105 of the corpus based on the document-word matrix determined at block 315. In the document-word matrix, each row can represent a document 105, and the documents 105 can be ordered the same as they were in the statistical relations matrix. Further, each column can represent a first-level topic, where the first-level topics are ordered in the same order as they are in the rows of the topic-word matrix. For each document 105, the topic definition subsystem 170 may identify the highest weight (i.e., value) in the row representing the document 105 and may categorize that document 105 as belonging to the first-level topic corresponding to the column in which that highest weight appears. In this manner, the topic definition subsystem 170 may assign each document 105 to a respective first-level topic.

Block 330 begins a loop across the first-level topics. For each first-level topic, the topic modeling system 130 may split the words of the first-level topics into second-level topics (i.e., subtopics) and may assign each document 105 of the first-level topic into a respective second-level topic of the first-level topic. To begin the loop, at block 330, the process 300 involves selecting a first-level topic for consideration. The first-level topic includes a set of words making up the topic, and a set of documents 105 of the corpus have been assigned to the first-level topic. For instance, the set of documents 105 is a subset of the entire corpus.

At block 335, the process 300 involves clustering the words of the first-level topic into clusters based on word embeddings (e.g., hyperbolic word embeddings) of the words. In some embodiments, the clustering subsystem 150 determines the clusters and the quantity of the clusters using a spatial clustering technique applied to the word embeddings. Operations performed by the clustering subsystem 150 are described in more detail below with reference to FIG. 4.

Blocks 340-355 relate to subdividing the words of the first-level topic into second-level topics, which are subtopics of the first-level topic, based on the clusters determined at block 335. Specifically, at block 340, the process 300 involves generating a semantic relations matrix, Matrix $SE_t$, for the first-level topic t. In some embodiments, the document analysis subsystem 140 of the topic modeling system 130 generates this matrix. Further, in some embodiments, the semantic relations matrix, Matrix $SE_t$, of the first-level topic represents semantic relations between pairs of words in documents 105 assigned to the first-level topic at block 325. In some embodiments, the document analysis subsystem 140 examines the documents 105 and, from that examination, generates the semantic relations matrix for the first-level topic. Matrix SE T may indicate co-occurrences between words in the documents 105 assigned to the first-level topic. In some embodiments, the hierarchy finder subsystem 160 constructs Matrix SE T based on words in the documents 105 assigned to the first-level topic. For instance, Matrix SE T includes rows representing words found in the documents 105 assigned to the first-level topic and columns also representing words found in the documents 105 assigned to the first-level topic. For instance, both the rows and columns may represent all words deemed significant (e.g., excluding certain words such as articles and prepositions) in the documents 105 assigned to the first-level topic. Each cell of semantic relations matrix for the first-level topic can indicate a count of how many documents 105 of the corpus include both the word represented by the corresponding row and the word represented by the corresponding column.

At block 345, the process 300 involves generating a statistical relations matrix, Matrix $SE_t$, for the first-level topic. In some embodiments, the document analysis subsystem 140 of the topic modeling system 130 generates this matrix. Further, in some embodiments, the statistical relations matrix, Matrix $ST_t$, represents statistical relations between words in the documents 105 assigned to the first-level topic. In some embodiments, the document analysis subsystem 140 examines the documents 105 and, from that examination, generates Matrix ST T. Matrix ST T may indicate co-occurrences of words within the documents 105 assigned to the first-level topic. In some embodiments, the document analysis subsystem 140 constructs Matrix $ST_t$ based on words in these documents 105. For instance, Matrix $ST_t$ includes rows representing the documents 105 assigned to the first-level topic and columns representing words found in the documents 105 assigned to the first-level topic. For instance, the rows may represent all documents 105 assigned to the first-level topic, and the columns may represent all words deemed significant (e.g., excluding certain words such as articles and prepositions) in the documents 105 assigned to the first-level topic. Each cell of Matrix $ST_t$ can indicate a count of how many times the word represented by the corresponding column appears in the document 105 represented by the corresponding row.

At block 350, the process 300 involves computing a document-topic matrix and a topic-word matrix for the first-level topic, based on the semantic relations matrix generated at block 340, the statistical relations matrix generated at block 345, and a hierarchical relations matrix. The hierarchical relations matrix may describe hierarchies between pairs of words found in the documents 105 assigned to the first-level topic. The use of the hierarchical relations matrix may enable the topic modeling system 130 to determine second-level topics that are coherent subtopics of the first-level topic. In some embodiments, the document-topic matrix and the topic-word matrix include information for defining second-level topics and assigning documents 105 of the corpus to respective topics, and further, the number of second-level topics indicated in these matrices are forced to equal the number of clusters determined at block 335. Operations performed by the hierarchy finder subsystem 160 to determine the hierarchy relations matrix and to compute the document-topic matrix and the topic-word matrix for the first-level topic are described in more detail below with reference to FIG. 6.

At block 355, the process 300 involves defining second-level topics that are subtopics of the first-level topic. In some embodiments, the topic definition subsystem 170 defines each second-level topic based on the topic-word matrix determined at block 350. In the topic-word matrix, each row can represent a second-level topic, and each column can represent a word. Thus, the number of second-level topics may equal the number of rows of the topic-word matrix. The topic definition subsystem 170 may define each second-level topic as the top l words (i.e., the words having the highest weights) in the row corresponding to that second-level topic. The value of l may be defined by an administrator and, in some embodiments, may be any value.

At block 360, the process 300 involves assigning each document to a second-level topic. In some embodiments, the topic definition subsystem 170 categorizes the documents 105 assigned to the first-level topic based on the document-word matrix determined at block 355. In the document-word matrix for the first-level topic, each row can represent a document 105, and the documents 105 can be ordered the same as they were in the statistical relations matrix for the first-level topic. Further, each column can represent a second-level topic, where the second-level topics are ordered in the same order as they are in the rows of the topic-word matrix for the first-level topic. For each document 105, the topic definition subsystem 170 may identify the highest weight (i.e., value) in the row representing the document 105 and may categorize that document 105 as belonging to the second-level topic corresponding to the column in which that highest weight appears. In this manner, the topic definition subsystem 170 may assign each document 105 to a respective second-level topic.

At decision block 365, the process 300 involves determining whether anymore first-level topics remain to be considered for division into second-level topics. If any first-level topics remain to the considered, then the process 300 returns to block 330 to select another first-level topic and perform another iteration of the loop. However, if no first-level topics remain (i.e., if all first-level topics have been considered), then the process 300 continues to block 370. At block 370, the HTM 110 is complete and may be used for various purposes, such as for generating custom content as described herein.

The above describes generating an HTM 110 having two levels of topics, including first-level topics and second-level topics. As described above, the second-level topics are generated by iterating over the first-level topics. In some embodiments, the HTM 110 can include additional levels of topics as well. For each additional level, the topic modeling system 130 may iterate over the previous level of topics. For instance, to generate third-level topics, the topic modeling system 130 may iterate over the second-level topics and, as such, may define the third-level topics for each second-level topic. To generate fourth-level topics, the topic modeling system 130 may iterate over the second-level topics and, as such, may define the fourth-level topics for each second-level topic, and so on for each level of the HTM 110 that is desired. In some embodiments, the number of levels in the HTM 110 is a hyper-parameter that may be defined, for instance, by an administrator.

Figure 4:
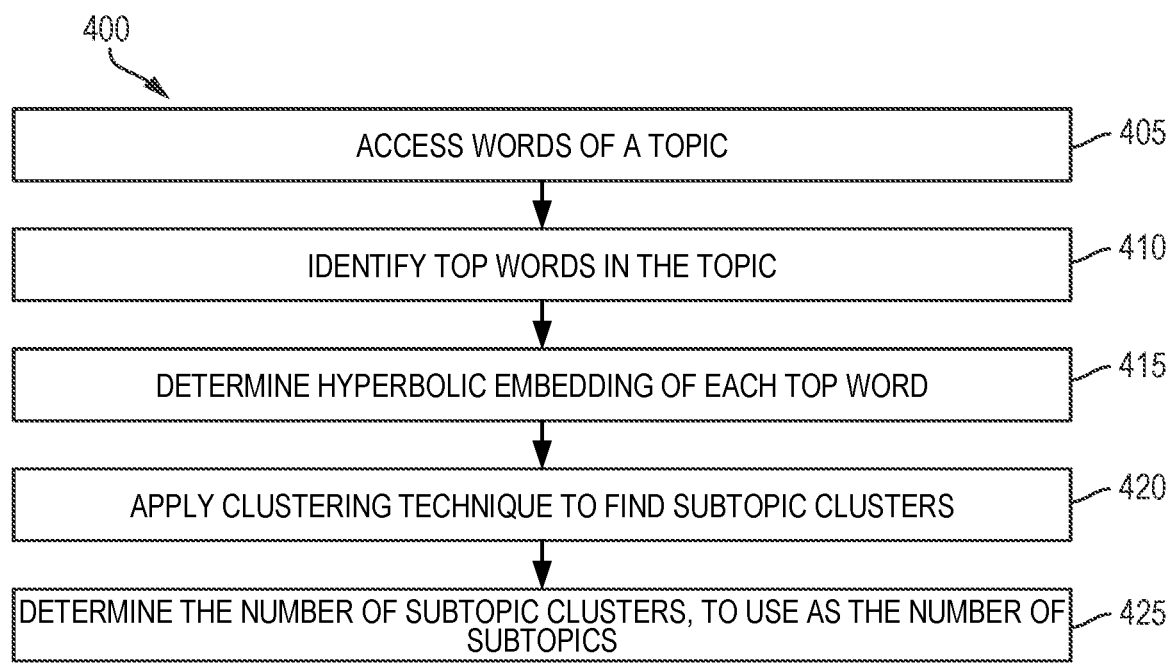
FIG. 4 is a flow diagram of an example of a process for clustering words of a topic based on word embeddings, such as hyperbolic word embeddings, according to some embodiments described herein.

FIG. 4 is a flow diagram of an example of a process 400 for clustering words of a topic into clusters based on word embeddings, according to some embodiments described herein. The process 400 depicted in FIG. 4 may be implemented in software executed by one or more processing units of a computing system, implemented in hardware, or implemented as a combination of software and hardware. This process 400 is intended to be illustrative and non-limiting. Although FIG. 4 depicts various processing operations occurring in a particular order, the particular order depicted is not required. In certain alternative embodiments, the processing may be performed in a different order, some operations may be performed in parallel, or operations may be added, removed, or combined together.

In some embodiments, the clustering subsystem 150 performs this process 400 or similar on a first-level topic, as at block 335 of the above process 300, to facilitate determination of second-level topics that are subtopics of the first-level topic. Additionally or alternatively, the clustering subsystem 150 may perform this process 400 or similar on a second-level topic to facilitate determination of third-level topics that are subtopics of the second-level topic. Generally, the clustering subsystem 150 may cluster words of a topic at a given level of the HTM 110 to facilitate the determination of subtopics for that topic.

As shown in FIG. 4, at block 405, the process 400 involves accessing words of a topic. As described above, a topic can be defined as a set of words. At block 410, the process involves identifying top words in the topic. For instance, the clustering subsystem 150 may identify a set of j words that have the highest weights for the topic according to the topic-word matrix for generated for the parent topic when determining this topic. The value of j can be determined by an administrator, for example. A low value of j might lead to too many topics that are not clearly distinct from one another while a high value of j might combine too many words into each topic.

At block 415, the process 400 involves determining the respective embedding for each top word identified at block 410. In some embodiments, the embeddings used are hyperbolic word embeddings. The topic modeling system may use a predefined system of word embeddings, such as the Hyperbolic-Glove embeddings or another Gaussian hyperbolic embedding system. As such, the clustering subsystem 150 may look up the embedding, in the predefined system, for each of the top words for use as described below. Hyperbolic embeddings have been shown to capture hierarchies better than Euclidean embeddings, and thus, the use of hyperbolic embeddings can contribute to generation of an interpretable HTM 110.

At block 420, the process 400 involves applying a clustering technique to the word embeddings determined at block 415 to cluster the word embeddings based on spatial positions. As described above, an embedding can be a vector representation of a word, and a vector can be represented as a point in space. For instance, an example of the clustering subsystem 150 uses the DBSCAN clustering algorithm with Fisher distance to cluster the word embeddings of the top words of the topic. In some embodiments, the act of determining the clusters involves identifying anchor words around which the clusters are formed. Each cluster may include one or more anchor words among the words of the cluster. The anchor words may be used by the hierarchy finder subsystem 160 as described further below. At block 425, the process 400 involves identifying the number of clusters determined at block 420. The number of topics may be used as the number of subtopics later generated for the topic.

Figure 5:
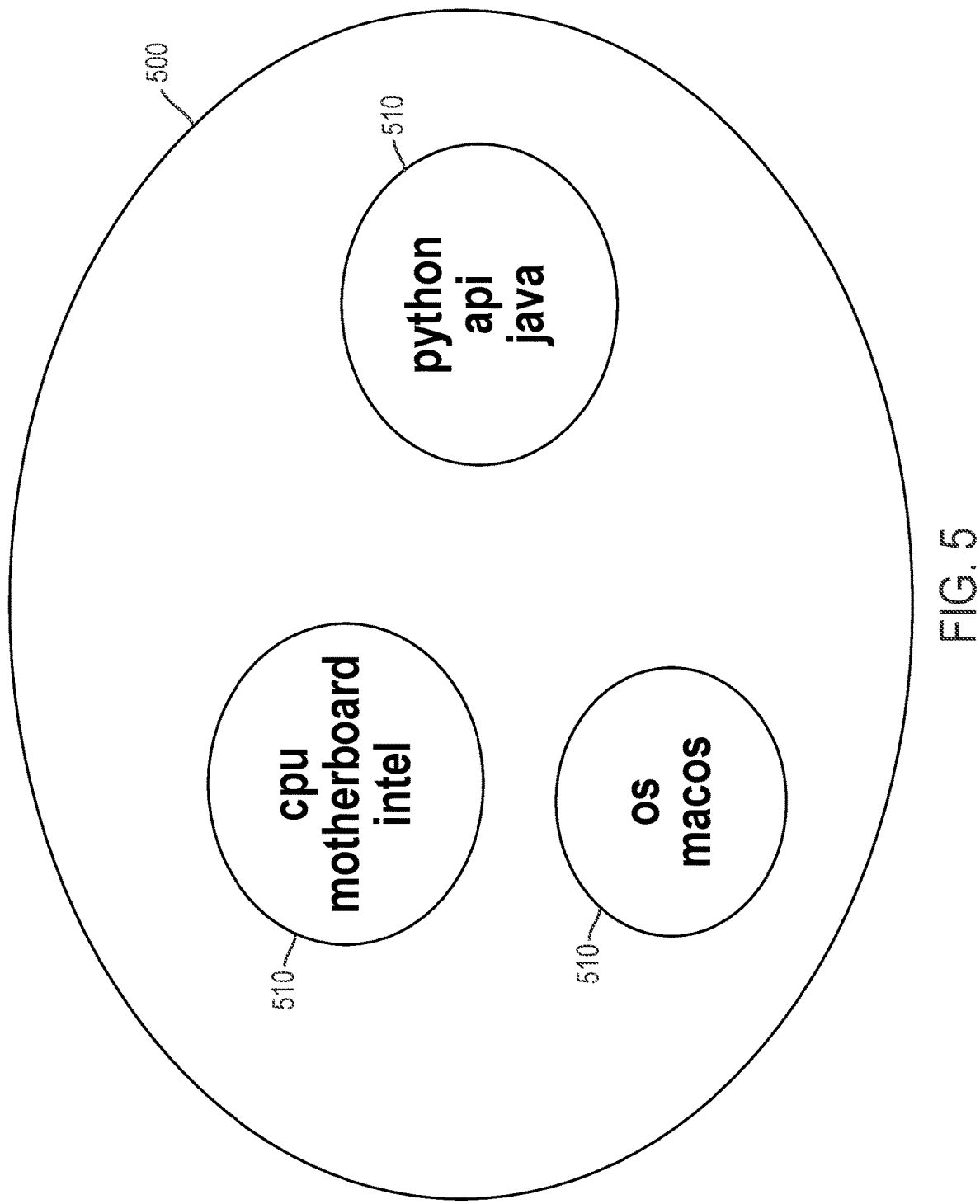
FIG. 5 is an illustration of clusters of words in a topic, as could be determined by the clustering subsystem to facilitate the determination of subtopics of a topic, according to some embodiments described herein.

FIG. 5 is an illustration of clusters 510 of words in a topic, as could be determined by the clustering subsystem 150 to facilitate the determination of subtopics of a topic, according to some embodiments described herein. Specifically, in this example, a first-level topic 500 includes the following words: api, cpu, motherboard, os, intel, python, java, and macos. To facilitate determination of second-level topics for the first-level topic 500, the clustering subsystem 150 groups these words into three clusters. A first cluster includes the anchor words "cpu," "motherboard," and "intel"; a second cluster includes the anchor words "os" and "macos"; and a third cluster includes the anchor words "python," "api," and "java." Although, these three clusters 510 may not precisely match the second-level topics that will be determined for the first-level topic 500, the clusters 510 may act as a guideline for determining the second-level topics. For instance, the quantity of clusters 510 is indicative of how many second-level topics the first-level topic 500 has within the documents 105 assigned to the first-level topic 500. More generally, the quantity of clusters 510 determined for a given topic may be indicative of how many subtopics of the topic are represented in the documents 105 assigned to the topic. As described below, the topic modeling system 130 may use this quantity as the quantity of the subtopics.

Figure 6:
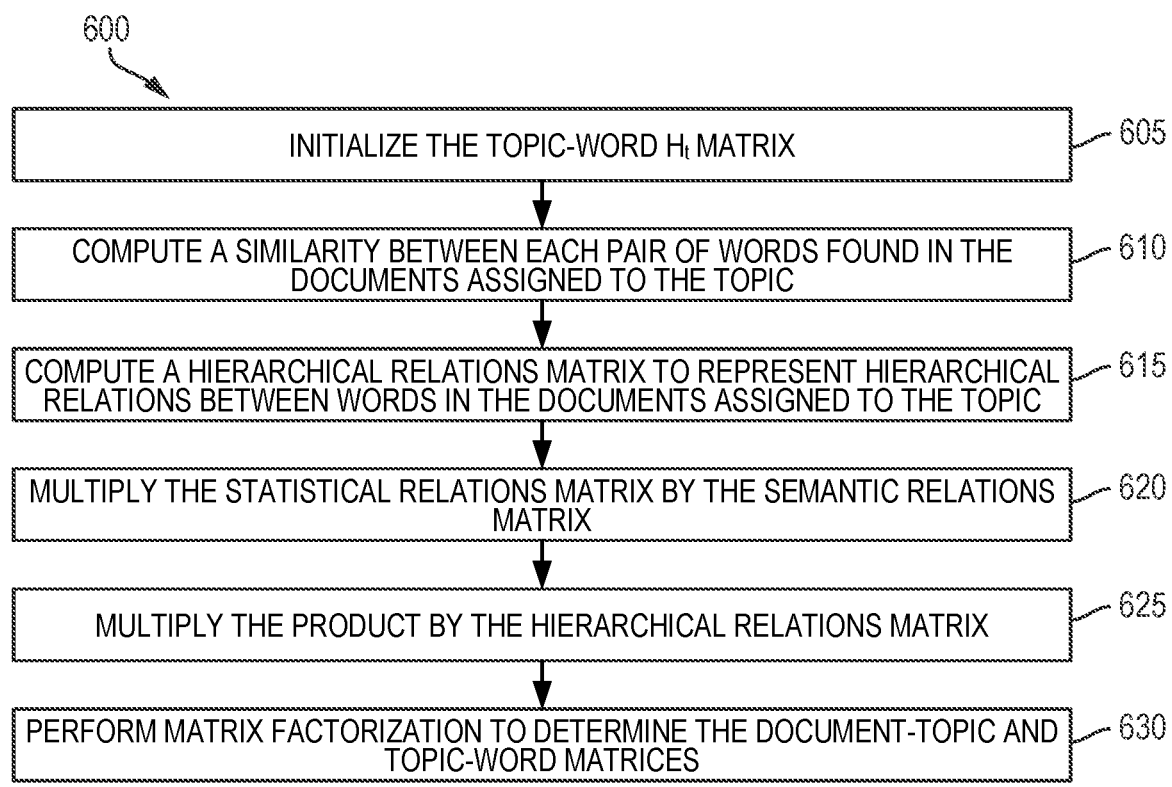
FIG. 6 is a flow diagram of an example of a process for computing a document-topic matrix and a topic-word matrix for a topic to facilitate determining subtopics of the topic, according to some embodiments described herein.

FIG. 6 is a flow diagram of an example of a process 600 for computing a document-topic matrix and a topic-word matrix for a topic to facilitate determining subtopics, according to some embodiments described herein. The process 600 depicted in FIG. 6 may be implemented in software executed by one or more processing units of a computing system, implemented in hardware, or implemented as a combination of software and hardware. This process 600 is intended to be illustrative and non-limiting. Although FIG. 6 depicts various processing operations occurring in a particular order, the particular order depicted is not required. In certain alternative embodiments, the processing may be performed in a different order, some operations may be performed in parallel, or operations may be added, removed, or combined together.

In some embodiments, the hierarchy finder subsystem 160 performs this process 600 or similar on a first-level topic, as at block 350 of the above process 300, to facilitate determination of second-level topics that are subtopics of the first-level topic. Additionally or alternatively, the hierarchy finder subsystem 160 may perform this process 600 or similar on a second-level topic to facilitate determination of third-level topics that are subtopics of the second-level topic. Generally, the hierarchy finder subsystem 160 may determine a document-topic matrix and a topic-word matrix for a topic at a given level of the HTM 110 to facilitate the determination of subtopics for that topic.

To this end, at block 605, to ensure that the subtopics learned correspond to the clusters 510 determined by the clustering subsystem 150, the process 600 involves initializing the topic-word matrix based on the clusters 510. In some embodiments, each cluster 510 corresponds to a subtopic being determined for the topic. The hierarchy finder subsystem 160 may initialize the topic-word matrix according to the log cardinalities corresponding to each subtopic. Specifically, for instance, if a first cluster 510 has a first set of anchor word (e.g., "cpu," "motherboard," and "intel"), then the hierarchy finder subsystem 160 initializes each row of the topic-word matrix with log cardinality scores between all words and the anchor words. For instance, if using word embeddings that are a hyperbolic Gaussian representation, the hierarchy finder subsystem 610 rotates the Gaussian space around the anchor words of each cluster. This can effectively center all other words of each subtopic around these anchor words, thus giving a root subtopic space with these anchor words. For each cell of the topic-word matrix, the hierarchy finder subsystem 610 may enter the log-cardinality, or variance, of each word in the rotated space. This initialization can give some weight to the words of the cluster 510 to help the topic modeling system 130 learn subtopics similar to the clusters 510 found for the words of the topic.

At block 610, the process 600 involves computing a similarity between each pair of the words found in the documents 105 assigned to the topic. In some embodiments, the similarity is a hyperbolic similarity based on a distance between word embeddings in hyperbolic space. Various techniques are possible for finding the similarity between words, and the hierarchy finder subsystem 160 may use one or more of such techniques. For instance, the similarity of a pair of words can be a function of distance between the corresponding word embeddings. The hierarchy finder subsystem 160 computes the cosine distance between word embeddings as the similarity, or a basis for the similarity, between the corresponding words. In some embodiments, the hierarchy finder subsystem 160 computes a normalized distance, such as a normalized cosine distance, between word embeddings to use as the similarity between the corresponding words. For instance, where dist($w_i$, $w_j$) is the cosine distance between a first word embedding $w_i$ of a first word and a second word embedding $w_j$ of a second word, the similarity f($w_i$, $w_j$) between the first word and the second word can be computed as follows $$f(w_i, w_j) = \frac{dist(w_i, w_j)}{GlobalMax(dist)}$$

In the above formula, GlobalMax (dist) is the maximum distance between (a) the most central word embedding of all word embeddings of all words in the documents 105 assigned to the topic and (b) the farthest word embedding from the most central word embedding. Using the above or another appropriate formula, the hierarchy finder subsystem 160 may compute the distance between each pair of words found in the documents 105 assigned to the topic.

At block 615, the process 600 involves computing a hierarchical relations matrix, Matrix HR. In some embodiments, the hierarchical relations matrix represents hierarchies between pairs of words of the documents 105 assigned to the topic, and as such, the use of the hierarchical relations matrix can enable the topic modeling system 130 to capture interpretable topic-subtopic relationships. The hierarchical relations matrix may be words-words matrix, having rows corresponding to the words found in the documents 105 assigned to the topic and also having columns corresponding to the words found in the documents 105. In some embodiments, the hierarchy finder subsystem 160 computes a cell HR(i,j) of the hierarchical relations matrix based on the hyperbolic similarity between the words $w_i$ and $w_j$ as follows:

$$HR(i, j) = \begin{cases} f(w_i, w_j) & \text{if } w_j \in K_i \\ 0 & \text{otherwise} \end{cases}$$

In the above formula, $K_i$ is the set of the k nearest neighbors, in terms of hyperbolic similarity, of the word embedding $w_i$. Thus, if using the above formula, a cell of the hierarchical relations matrix may be set to the hyperbolic similarity of the words represented by the row and the column if the word embedding $w_j$ of the word corresponding to the column is a nearest neighbor of the word embedding of the word corresponding to the row. Otherwise, the value of the cell can be set to 0. In some other embodiments, however, the hierarchy finder subsystem 160 sets each cell to the value of the corresponding hyperbolic similarity, regardless of whether the corresponding word embeddings are nearest neighbors. Various implementations are possible and are within the scope of this disclosure.

At block 620, the process 600 involves multiplying the statistical relations matrix ST t for the topic by the semantic relations matrix SE t for the topic. As described above, the statistical relations matrix can include rows corresponding to documents and columns corresponding to words, and the semantic relations matrix can include rows and columns corresponding to words. Thus, with standard matrix multiplication, the product of the multiplication is a matrix including rows corresponding to documents and columns corresponding to words. At block 625, the process 600 involves multiplying the product of block 620 by the hierarchical relations matrix. In some embodiments, this results in another matrix having rows corresponding to documents and columns corresponding to words.

At block 630, the process 600 involves performing matrix factorization on the product of block 625 to produce the document-topic matrix W and the topic-word matrix H, enforcing a quantity of topics equal to the quantity of clusters 510. Generally, matrix factorization can break down a matrix X-Y (i.e., X rows and Y columns) into two matrices, a first matrix X-Z and a second matrix Z-Y. Various techniques exist to force the value of Z to be a desired value, and in some embodiments, the hierarchy finder subsystem 160 applies one or more of such techniques to ensure that the resulting document-topic matrix W has a number of columns equal to the number of clusters 510 and that the resulting topic-word matrix H has a number of rows equal to the number of clusters 510.

In some embodiments, the document-topic matrix and the topic-word matrix include information for defining subtopics and assigning documents 105 of the topic to respective subtopics, as described above with reference to blocks 355 and 360 of the process 300 for generating an HTM 110. In some embodiments, due to the number of rows of the topic-word matrix being equal to the number of clusters 510, the number of subtopics defined for the topic will thus also equal the number of clusters 510 found for the topic. Because the number of topics is defined based on clustering over hyperbolic word embeddings and because the subtopics are determined based on the clusters 510, the subtopics may have an easily understandable relationship with the topic, in contrast to subtopics determined in many existing systems for topic modeling.

Example of a Content Generation System

As discussed above, once built, the HTM 110 can be used for various purposes. In some embodiments, for instance, the HTM 110 is useable by a content generation system 180 to generate custom content for users based on documents 105 accessed by those users. As described above, an online system 190 has access to one or more of the documents 105 associated with the HTM 110 (i.e., used to build the HTM 110). A user could access a document 105 by operating a client 120 to communicate with the online system 190. As described in more detail below, when the content generation system 180 receives an indication of such an access, the content generation system 180 can generate custom content for delivery to the client 120 and for use by the user.

Figure 7:
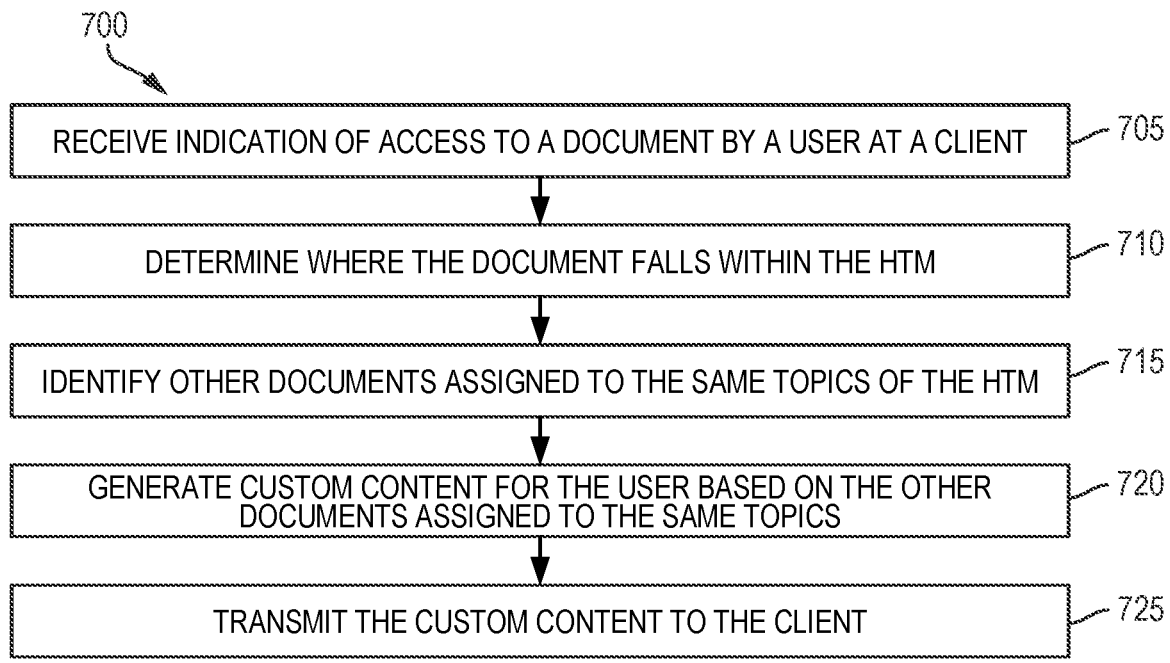
FIG. 7 is a flow diagram of an example of a process for using an HTM to provide custom content to a client based on document access, according to some embodiments described herein.

FIG. 7 is a flow diagram of an example of a process 700 for using an HTM 110 to provide custom content to a client 120 based on document access, according to some embodiments described herein. The process 700 depicted in FIG. 7 may be implemented in software executed by one or more processing units of a computing system, implemented in hardware, or implemented as a combination of software and hardware. This process 700 is intended to be illustrative and non-limiting. Although FIG. 7 depicts various processing operations occurring in a particular order, the particular order depicted is not required. In certain alternative embodiments, the processing may be performed in a different order, some operations may be performed in parallel, or operations may be added, removed, or combined together. In some embodiments, the content generation system 180 performs this process 700 or similar on an on-demand basis, such as each time a document access is detected.

As shown in FIG. 7, at block 705, the process 700 involves receiving an indication of access by a user to a document 105 associated with an HTM 110. In some embodiments, for instance, the user operated a client 120 to access a document 105 on the online system 190. In turn, the online system 190 notified the content generation system 180 of the access to the document 105.

At block 710, the process 700 involves determining where the document falls within the HTM 110. In other words, the content generation system 180 may identify which topic the document 105 belongs to at each topic level of the HTM 110. This may include, for instance, identifying a first-level topic to which the document 105 is assigned, a second-level topic to which the document 105 is assigned, and additional topics at other topic levels, if any, of the HTM 110.

At block 715, the process 700 involves identifying one or more other documents 105 having topics in common with the document 105. As described above with reference to FIG. 2, each node 210 of the HTM 110 represents a set of topic at various levels of a topic hierarchy. In some embodiments, the document 105 has already been assigned to a set of topics, including a first-level topic and possibly lower-lever topics, and is thus associated with a particular node 210 of the topic hierarchy. In some embodiments, when seeking one or more other documents having topics in common with the document 105, the content generation system 180 starts with the current node 210 to which the document 105 is assigned. If any other documents 105 are associated with that current node 210 or with a node 210 that is a descendent of the current node 210, then the content generation system 180 may select one or more of such documents 105 as the other documents 105 with topics in common with the document 105.

However, if no such other documents 105 are identified, the content generation system 180 may iteratively move up the HTM 110 to the parent node 210, making that parent node 210 the current node 210. If any other documents 105 are associated with that current node 210, then the content generation system 180 may select one or more of such documents 105 as the identified documents with topics in common with the document 105. If no such other documents 105 are identified, the content generation system 180 may iteratively move up the HTM 110 to the parent node 210, making that parent node 210 the current node 210. The content generation system 180 may continue traversing the hierarchy upward until one or more other documents 105 are identified.

At block 720, the process 700 involves generating custom content for the user based on the one or more other documents 105 identified at block 715. The custom content can take various forms. For example, the custom content could be a list of the one or more other documents 105, possibly including links to access the one or more other documents 105, or the custom content could be a marketing message attempting to sell a product related to the one or more other documents 105. Various implementations are possible and are within the scope of this disclosure.

At block 725, the content generation system 180 may transmit the custom content to the client 120, which may present the custom content to the user. Thus, the HTM 110 facilitated the generation of custom content for the user based on the user's activity of accessing the document 105.

Example of a Computing System for Implementing Some Embodiments

Figure 8:
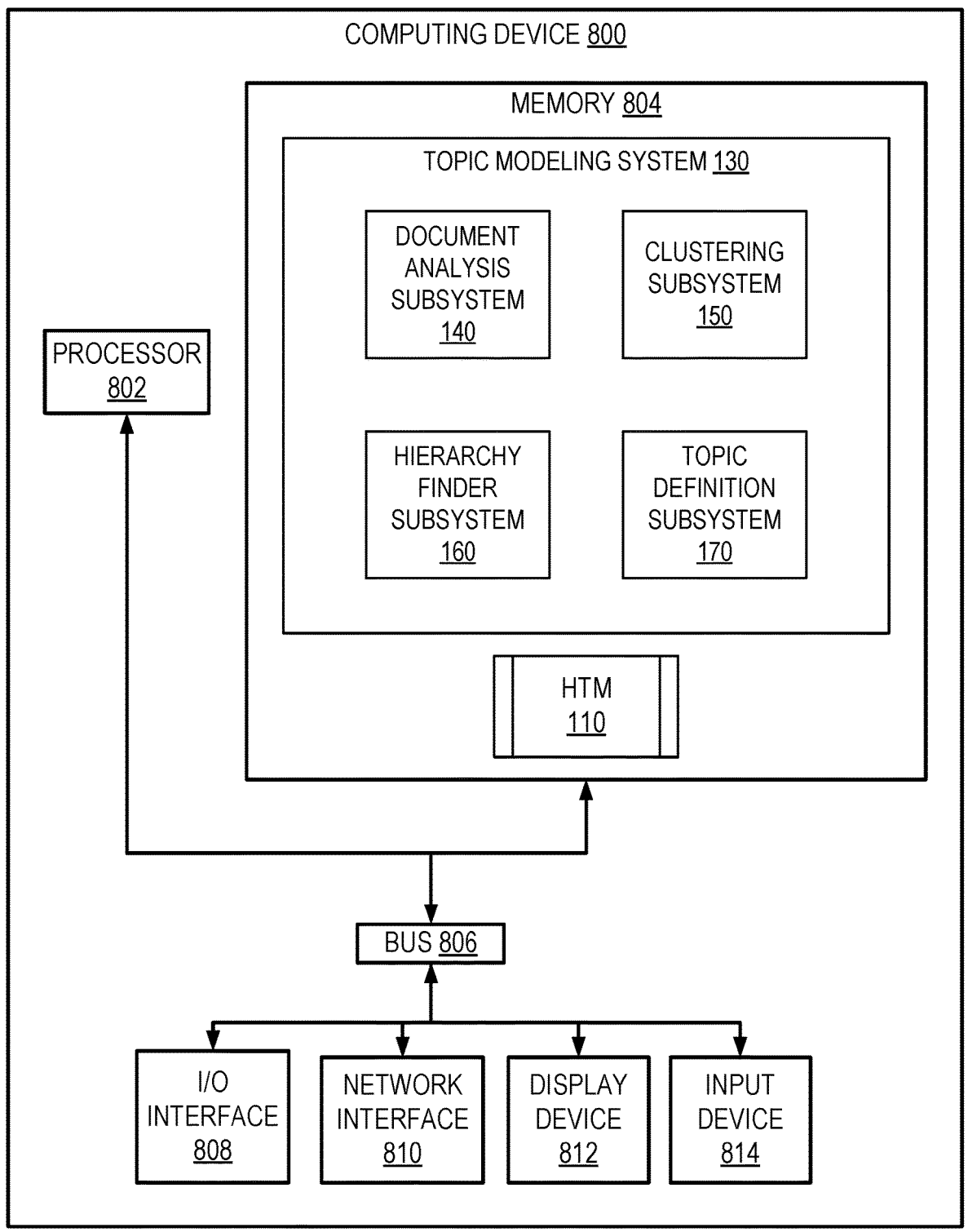
FIG. 8 is a diagram of an example of a computing system for performing certain operations described herein, according to some embodiments.

FIG. 8 is a diagram of an example of a computing system 800 for performing certain operations described herein, according to some embodiments. A suitable computing system or group of computing systems can be used for performing the operations described herein. For example, FIG. 8 depicts an example of a computing system 800 that can be used to execute aspects of the content customization system 100 or various other aspects described herein. In some embodiments, as shown for instance, the computing system 800 executes the topic modeling system 130 including the document analysis subsystem 140, the clustering subsystem 150, the hierarchy finder subsystem 160, and the topic definition subsystem 170.

The depicted example of a computing system 800 includes a processor 802 communicatively coupled to one or more memory devices 804. The processor 802 executes computer-executable program code stored in a memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

The memory device 804 includes a suitable non-transitory computer-readable medium for storing data, program code, or both. A computer-readable medium can include an electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or another medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 800 may also include a number of external or internal devices, such as input or output devices. For example, the computing system 800 is shown with one or more input/output ("I/O") interfaces 808. An I/O interface 808 can receive input from input devices or provide output to output devices. One or more buses 806 are also included in the computing system 800. The bus 806 communicatively couples one or more components of a respective one of the computing system 800.

The computing system 800 executes program code that configures the processor 802 to perform one or more of the operations described herein. The program code includes, for example, the document analysis subsystem 140, the clustering subsystem 150, the hierarchy finder subsystem 160, the topic definition subsystem 170, or applications that perform one or more operations described herein. The program code may be resident in the memory device 804 or any suitable computer-readable medium and may be executed by the processor 802 or another suitable processor. In the depicted embodiment, the computing system 800 does not include program code for implementing the content generation system 180; rather, a separate computing system (not shown) may include program code for implementing the content generation system 180 that uses the HTM 110. In additional or alternative embodiments, however, program code for the content generation system 180 is stored in the memory device 804 of the computing system 800 along with program code for the topic modeling system 130.

The computing system 800 can access models, datasets, or functions of the topic modeling system 130 or other aspects of the content customization system 100 in any suitable manner. In some embodiments, some or all models, datasets, and functions used by the topic modeling system 130 are stored in the memory device 804 of a computing system 800, as in the example depicted in FIG. 8. For instance, the HTM 110 may be resident on the computing system 800 at least while the HTM 110 is being generated; after the HTM 110 is complete, the HTM 110 may be copied to a separate computing system that runs the content generation system 180. In additional or alternative embodiments, certain aspects of the content customization system 100 are stored or executed on a separate computing system, which provides access to necessary models, datasets, and functions as needed, such as via a data network.

The computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and the like. The computing system 800 is able to communicate with one or more other computing devices (e.g., a separate computing device acting as a client 120) via a data network using the network interface device 810.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method comprising:
   determining first-level topics in a hierarchical topic model (HTM) related to a corpus of documents, wherein a first-level topic of the first-level topics comprises multiple words;
   generating a number of clusters based on word embeddings of the multiple words;
   subdividing the multiple words into second-level topics comprising subtopics of the first-level topic, wherein a number of the second-level topics is equal to the number of clusters;
   assigning a document of the corpus of documents to the first-level topic and to a second-level topic of the second-level topics;
   receiving an indication of access to the document at a client computing device; and
   generating, using the HTM, custom content configured for the client computing device based on one or more other documents of the corpus of documents assigned to the first-level topic and the second-level topic.

2. The method of claim 1, wherein generating a number of clusters based on word embeddings of the multiple words comprises clustering the multiple words into clusters based on hyperbolic word embeddings of the multiple words.

3. The method of claim 2, wherein subdividing the multiple words into second-level topics comprising subtopics of the first-level topic comprises:
   computing a first matrix representing hierarchical relations between pairs of document words found in documents assigned to the first-level topic;
   computing a second matrix based on statistical relations and semantic relations associated with (i) the document words found in the documents assigned to the first-level topic and (ii) the documents assigned to the first-level topic;
   performing matrix factorization on a product of the second matrix and the first matrix; and
   extracting the second-level topics from a result of the matrix factorization.

4. The method of claim 3, wherein computing the first matrix representing hierarchical relations between the pairs of document words found in documents assigned to the first-level topic comprises determining hyperbolic distances between the pairs of document words.

5. The method of claim 3, wherein extracting the second-level topics from the result of the matrix factorization comprises:
   accessing a third matrix resulting from the matrix factorization, wherein the third matrix comprises weights representing relationships between the second-level topics and the multiple words of the first-level topic; and
   extracting, from a row corresponding to the second-level topic in the third matrix, additional words representing the second-level topic.

6. The method of claim 5, wherein the second-level topic comprises a proper subset of the multiple words in the first-level topic.

7. The method of claim 3, wherein assigning the document to the second-level topic comprises:
- accessing a third matrix resulting from the matrix factorization, wherein the third matrix comprises weights representing relationships between the second-level topics and documents that are assigned to the first-level topic;
- identifying a row of the third matrix corresponding to the document; and
- determining that, in the row, a weight in a column corresponding to the second-level topic is greater than other weights in the row.

8. A system comprising:
- a memory component; and
- a processing device coupled to the memory component, the processing device to perform operations comprising:
  - determining first-level topics in a hierarchical topic model (HTM) related to a corpus of documents, wherein a first-level topic of the first-level topics comprises multiple words;
  - generating a number of clusters based on word embeddings of the multiple words;
  - subdividing the multiple words into second-level topics comprising subtopics of the first-level topic, wherein a number of the second-level topics is equal to the number of clusters;
  - assigning a document of the corpus of documents to the first-level topic and to a second-level topic of the second-level topics;
  - receiving an indication of access to the document at a client computing device; and
  - generating, using the HTM, custom content configured for the client computing device based on one or more other documents of the corpus of documents assigned to the first-level topic and the second-level topic.

9. The system of claim 8, wherein generating a number of clusters based on word embeddings of the multiple words comprises clustering the multiple words into clusters based on hyperbolic word embeddings of the multiple words.

10. The system of claim 9, wherein subdividing the multiple words into second-level topics comprising subtopics of the first-level topic comprises:
- computing a first matrix representing hierarchical relations between pairs of document words found in documents assigned to the first-level topic;
- computing a second matrix based on statistical relations and semantic relations associated with (i) the document words found in the documents assigned to the first-level topic and (ii) the documents assigned to the first-level topic;
- performing matrix factorization on a product of the second matrix and the first matrix; and
- extracting the second-level topics from a result of the matrix factorization.

11. The system of claim 10, wherein computing the first matrix representing hierarchical relations between the pairs of document words found in documents assigned to the first-level topic comprises determining hyperbolic distances between the pairs of document words.

12. The system of claim 10, wherein extracting the second-level topics from the result of the matrix factorization comprises:
- accessing a third matrix resulting from the matrix factorization, wherein the third matrix comprises weights representing relationships between the second-level topics and the multiple words of the first-level topic; and
- extracting, from a row corresponding to the second-level topic in the third matrix, additional words representing the second-level topic.

13. The system of claim 12, wherein the second-level topic comprises a proper subset of the multiple words in the first-level topic.

14. The system of claim 10, wherein assigning the document to the second-level topic comprises:
- accessing a third matrix resulting from the matrix factorization, wherein the third matrix comprises weights representing relationships between the second-level topics and documents that are assigned to the first-level topic;
- identifying a row of the third matrix corresponding to the document; and
- determining that, in the row, a weight in a column corresponding to the second-level topic is greater than other weights in the row.

15. A non-transitory computer-readable medium storing executable instructions, which when executed by a processing device, cause the processing device to perform operations comprising:
- determining first-level topics in a hierarchical topic model (HTM) related to a corpus of documents;
- determining, based on hyperbolic word embeddings of words found in documents assigned to a first-level topic of the first-level topics, hierarchical relations between pairs of the words in the documents assigned to the first-level topic;
- determining statistical relations between the words and the documents assigned to the first-level topic;
- determining semantic relations between the pairs of the words in the documents assigned to the first-level topic;
- defining second-level topics as subtopics of the first-level topic in the HTM, based on the hierarchical relations, the statistical relations, and the semantic relations, wherein a number of the second-level topics is equal to a number of clusters determined using the hyperbolic word embeddings; and
- using the HTM to provide custom content for users based on access at a client computing device to documents in the corpus.

16. The non-transitory computer-readable medium of claim 15, wherein the first-level topic comprises multiple topic words.

17. The non-transitory computer-readable medium of claim 16, wherein determining the second-level topics as subtopics of the first-level topic comprises:
- computing a first matrix as a product of a matrix for the statistical relations and another matrix for the semantic relations;
- performing matrix factorization on a product of the first matrix and a second matrix for the hierarchical relations, wherein the matrix factorization is based on a count of the clusters; and
- extracting the second-level topics from a result of the matrix factorization.

18. The non-transitory computer-readable medium of claim 15, wherein determining the hierarchical relations between the pairs of the words in the documents assigned to the first-level topic comprises determining hyperbolic distances between the pairs of the words in the documents assigned to the first-level topic.

19. The non-transitory computer-readable medium of claim 17, wherein extracting the second-level topics from the result of the matrix factorization comprises:
   accessing a third matrix resulting from the matrix factorization, wherein the third matrix comprises weights representing relationships between the second-level topics and the multiple topic words of the first-level topic; and
   extracting, from a row corresponding to the second-level topic in the third matrix, additional words representing the second-level topic.

20. The non-transitory computer-readable medium of claim 17, wherein assigning the document to the second-level topic comprises:
   accessing a third matrix resulting from the matrix factorization, wherein the third matrix comprises weights representing relationships between the second-level topics and documents that are assigned to the first-level topic;
   identifying a row of the third matrix corresponding to the document; and
   determining that, in the row, a weight in a column corresponding to the second-level topic is greater than other weights in the row.

* * * * *